United States Patent [19]

Vomfell

[11] Patent Number: 4,907,369
[45] Date of Patent: Mar. 13, 1990

[54] MULTI-PURPOSE STAKE

[76] Inventor: Anton L. Vomfell, 38507 Moravian Dr., Mount Clemens, Mich. 48043

[21] Appl. No.: 111,250

[22] Filed: Oct. 22, 1987

[51] Int. Cl.$^4$ ............................................. A01G 17/14
[52] U.S. Cl. ........................................... 47/46; 47/47
[58] Field of Search .................. 47/42, 43, 44, 45, 46, 47/47, 39, 70; 135/118; 2/321, 322; 248/156, 530; 24/169, 198

[56] References Cited

U.S. PATENT DOCUMENTS

| 126,193 | 4/1872 | Eaton | 47/47 X |
|---|---|---|---|
| 1,769,753 | 7/1930 | Reuter | 24/198 |
| 2,505,885 | 5/1950 | Davis, Jr. | 248/156 X |
| 2,817,346 | 12/1957 | Whitney | 135/118 |
| 4,627,132 | 12/1986 | Markham | 24/169 |

FOREIGN PATENT DOCUMENTS

| 277951 | 1/1966 | Australia | 47/47 |
|---|---|---|---|
| 68769 | 8/1892 | Fed. Rep. of Germany | 47/44 |
| 693565 | 7/1940 | Fed. Rep. of Germany | 47/47 |
| 2397147 | 3/1979 | France | 47/46 |
| 508284 | of 1955 | Italy | 47/47 |
| 89325 | 5/1958 | Netherlands | 47/47 |
| 313324 | 7/1953 | Switzerland | 47/47 |
| 11376 | of 1885 | United Kingdom | 47/47 |
| 154032 | 11/1920 | United Kingdom | 24/198 |
| 184586 | 8/1922 | United Kingdom | 47/44 |
| 61372 | 12/1948 | United Kingdom | 47/47 |
| 714110 | 8/1954 | United Kingdom | 47/47 |

Primary Examiner—Robert A. Hafer
Assistant Examiner—Kevin G. Rooney
Attorney, Agent, or Firm—Gerald E. McGlynn, Jr.

[57] ABSTRACT

A multi-purpose stake includes a stake means forming a longitudinal member adapted to be supported substantially perpendicular to a support surface. An aperture means forms at least one pair of laterally spaced apertures in the stake means. Either a belt means is disposed in a pair of apertures and adapted to form an enclosure to support an object thereon of a snap-on means may be used for removably engaging the apertures to support an object thereon.

1 Claim, 4 Drawing Sheets

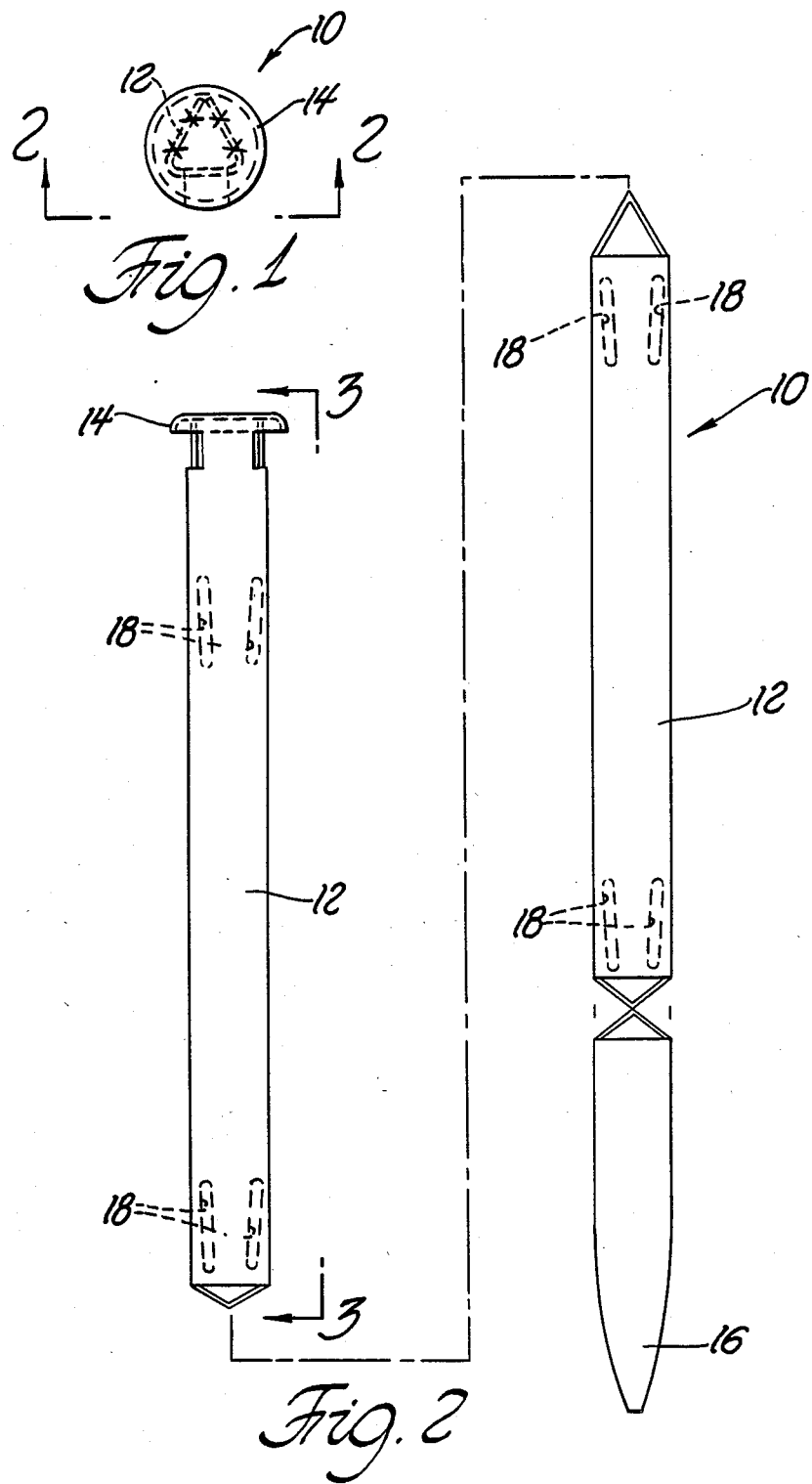

MULTI-PURPOSE STAKE

TECHNICAL FIELD

The subject invention relates to a stake for supporting bushes or shrubbery and a chain or rope, and particularly, to a single stake for accomplishing these purposes.

BACKGROUND OF THE INVENTION

A stake is typically used as a vertical support member to prop up a bush or the like. A stake usually comprises a longitudinal member having a beveled end that is driven into the ground. A plurality of stakes may encompass the bush and a string tied around the stakes to prop the bush up vertically therebetween. An example of such a device is disclosed in U.S. Pat. No. 1,587,740, issued June 8, 1926, to Wiswell and U.S. Pat. No. 3,720,401, issued Mar. 13, 1973, to Loch, et al.

The problem with such stakes is that they may have only one use or purpose; that is, there may be no hole to allow a rope to pass through the stake. Further, these stakes may be used to allow a wire to pass therethrough, but not for also supporting a chain. Thus, the stake is usually limited to one purpose.

SUMMARY OF THE INVENTION

A multi-purpose stake includes a stake means forming a longitudinal member adapted to be supported substantially perpendicular to a support surface. An aperture means forms at least one pair of laterally spaced apertures in the stake means. Either a belt means is disposed in a pair of apertures and adapted to form a substantially diametrical configuration to support an object thereon or a snap-on means may be used for removably engaging the apertures to support an object thereon.

Accordingly, the subject invention has a series of longitudinally and laterally spaced apertures to allow a belt to pass therethrough to support a bush or shrubbery or a snap-on member to support a rope or chain. Thus, the stake is multi-purpose.

FIGURES IN THE DRAWINGS

Other advantages of the present invention will be readily appreciated as the same becomes better understood by reference to the following detailed description when considered in connection with the accompanying drawings wherein:

FIG. 1 is a plan view of the stake of the subject invention;

FIG. 2 is an elevational view of the subject invention;

DETAILED DESCRIPTION OF THE DRAWINGS

Figure 3:
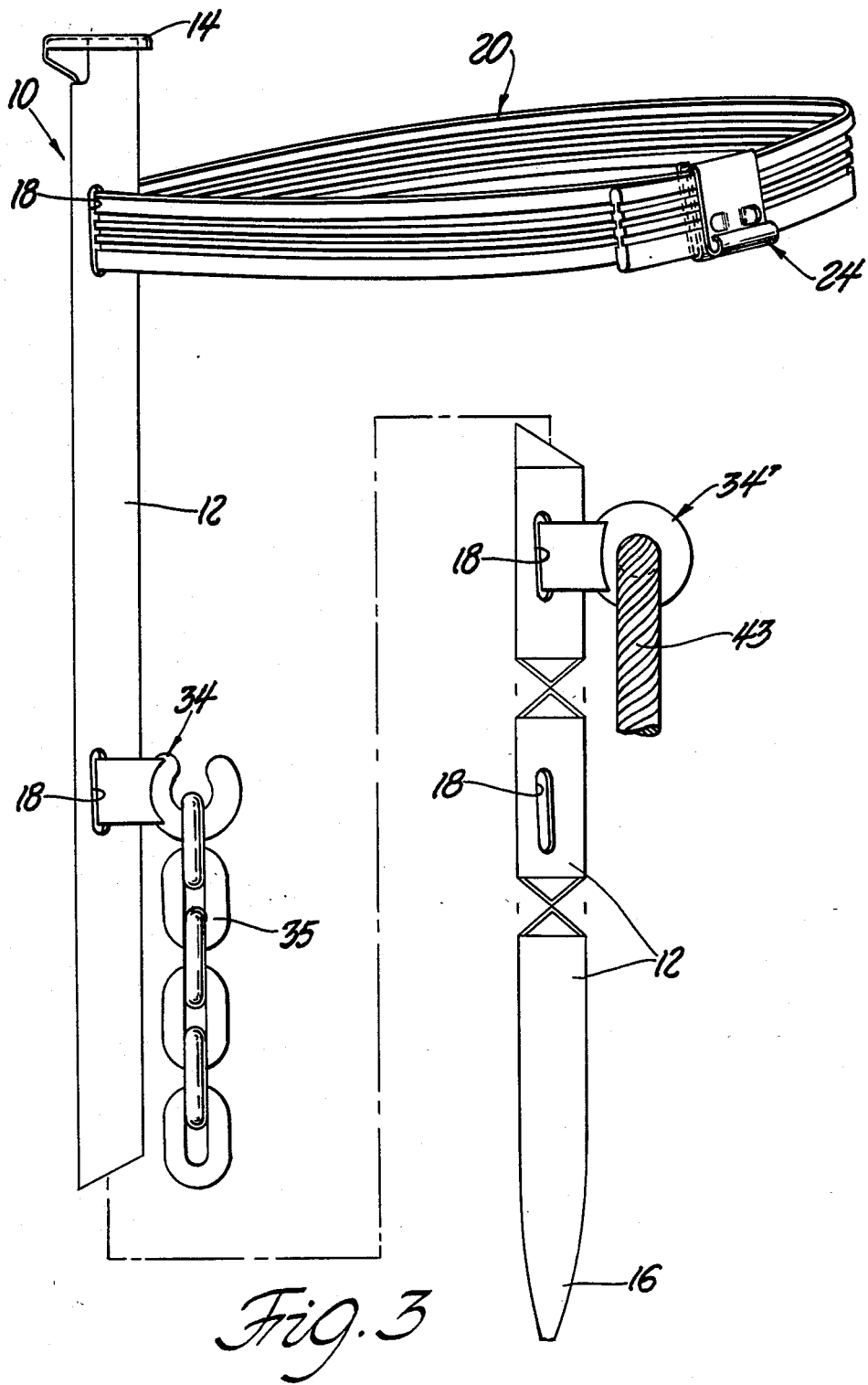
FIG. 3 is a side elevational view of the belt and snap-on members of the subject invention.

A multi-purpose stake is generally shown at 10 in FIGS. 1 and 2. The multi-purpose stake 10 includes a stake means forming a longitudinal member 12 adapted to be suported substantially perpendicular in and to a support surface such as the ground or soil. The longitudinal member 12 is tubular and has a triangular cross-sectional configuration. The longitudinal member 12 includes a closed portion 14 at one end and a beveled-shaped or tapered portion 16 at the other end to engage the support surface. The closed portion 14 comprises a flange or head 14 to close one end of the longitudinal member 12. The flange 14 is circular and has a diameter larger than the cross-sectional area of the longitudinal member 12. The flange 14 is spot welded to the longitudinal member 12.

The stake 10 includes aperture means forming at least one pair of apertures 18 laterally spaced on the longitudinal member 12. One of the apertures 18 is on one side of the longitudinal member 12 and the other on an adjacent side. Preferably, the stake 10 includes a plurality of apertures 18 longitudinally spaced along the longitudinal member 12. The apertures 18 are elongated and inclined.

Figure 4:
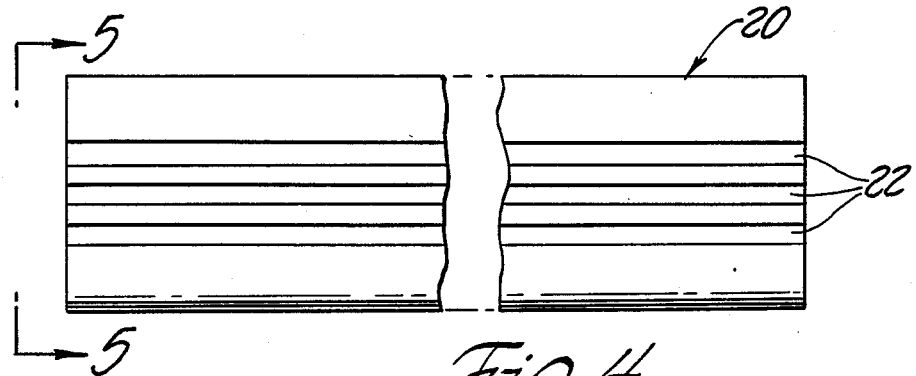
FIG. 4 is an elevational view of the belt of the subject invention.
Figure 5:
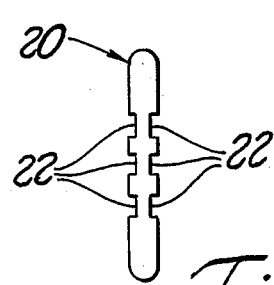
FIG. 5 is a sectional view of the belt of the subject invention taken along line 5—5 of FIG. 4.
Figure 7:
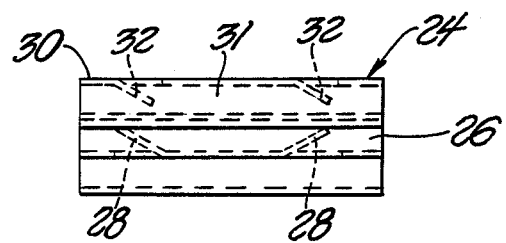
FIG. 7 is a plan view of the clip member of the subject invention.
Figure 6:
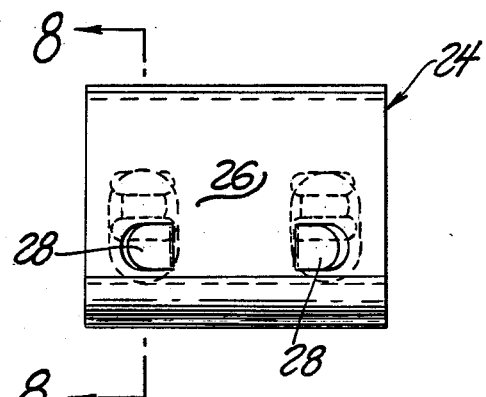
FIG. 6 is an elevational view of the clip member of the subject invention.
Figure 8:
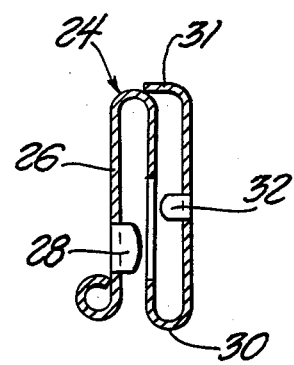
FIG. 8 is a sectional view of the clip member of the subject invention taken along line 8—8 of FIG. 6.
Figure 9:
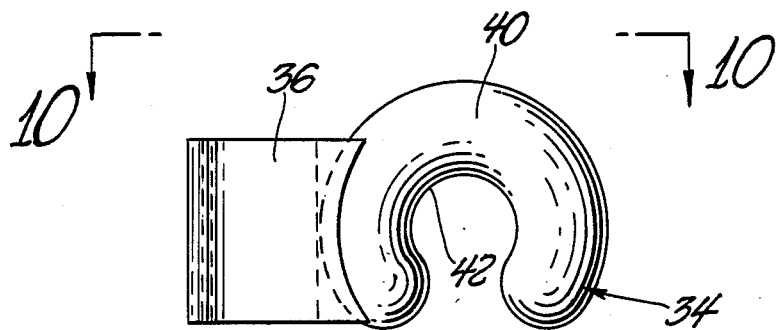
FIG. 9 is an elevational view of the snap-on member of the subject invention.
Figure 10:
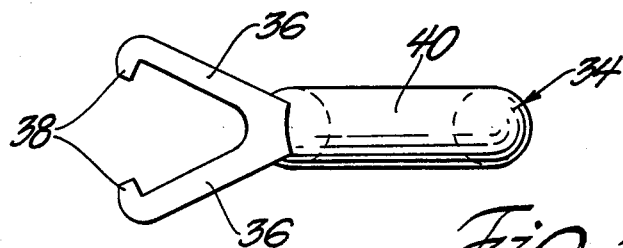
FIG. 10 is a plan view of the snap-on member taken along line 10—10 of FIG. 9.
Figure 11:
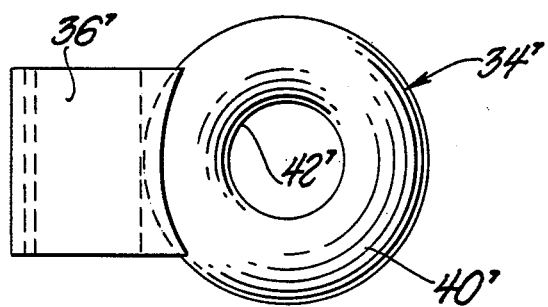
FIG. 11 is an elevational view of an alternate embodiment of the clip member of FIG. 9.

As illustrated in FIGS. 3 through 5 the multipurpose stake 10 may include a belt means, generally indicated at 20, disposed in a pair of laterally spaced apertures 18 of the longitudinal member 12 to form a substantially diametrical configuration or enclosure to support an object such as a bush or shrubbery (not shown) therein. The belt means 20 comprises a belt 20 made of a polymer material and including a plurality of grooves 22 laterally spaced and longitudinally extending therealong.

As illustrated in FIGS. 3 and 6 through 8, a clip means, generally indicated at 24, secures the ends of the belt 20 together and allows the diameter of the belt 20 to be adjusted. The clip means 24 comprises a spring clip 24 which secures the belt 20 together, similar to a buckle on a belt to hold up a person's pants. The spring clip 24 has a double U-shaped configuration. More specifically, the spring clip 24 includes a first portion 26 having a U-shaped configuration in a first direction to allow a portion of the belt 20 to be disposed therein. A pair of longitudinally spaced first projections 28 on the first U-shaped portion 26 project or extend inwardly on an angle to engage the belt 20 to secure the belt 20 therein. The spring clip 24 also includes a second U-shaped portion 30 having a U-shaped configuration in the opposite direction to the first portion 26 to allow another portion of the belt 20 to be disposed therein. The second U-shaped portion 28 also includes a closed end 31 to prevent the belt 20 from laterally exiting the spring clip 24. The second U-shaped portion 28 further includes a pair of longitudinally spaced second projections 32 extending inwardly on an angle to secure the belt 20 therein.

As illustrated in FIGS. 3 and 9 through 11, the stake 10 may include a snap-on means 34, for removably engaging a pair of apertures 18 to support an object such as a chain 35 thereon. The snap-on means 34 comprises a flexible member 34 having a pair of legs 36 extending outwardly and forming a V-shaped configuration with a flange 38 disposed transversely on each leg 36 at one end thereof. The legs 36 are flexible to spread apart when placed over the triangular configuration of the longitudinal member 12 and resilent to snap in place with the flanges 38 engaging the apertures 18 and being disposed therein. The member 34 also includes a body portion 40 attached to the legs 36 to support an object thereon. The body portion 40 may be a C-shaped member forming an aperture 42 therein. The C-shaped body portion 40 allows a chain 35 to be attached thereto or supported thereon.

An alternate embodiment of the snap-on member 34, wherein like parts have like prime numerals, is generally indicated by the numeral 34'. The body portion 40' may be completely circular similar to an "eye" of a screw or bolt to allow a rope 43 to be disposed in or communicate through the aperture 42' as illustrated in FIG. 3.

In operation, the multi-purpose stake 10 is driven into the ground by pressure or force being applied from a hammer or the like to the head or flange 14 to drive the longitudinal member 12 into the ground to hold the sake 10 in a substanially vertical position. A belt 20 may be disposed in or passed through a pair of apertures 18. One portion of the belt 20 is disposed in the second portion 28 of the spring clip 24 and another portion of the belt 20 is disposed in the first portion 26 of the spring clip 24. The belt 20 is held in the spring clip 24 by the projections 30, 32. The belt 20 may then be adjusted by moving the belt 20 and spring clip 24, relative to each other.

Alternatively, the snap-on members 34,34' may be attached to the longitudinal member 12 to support a chain 35 or rope 43. The legs 36 are spread apart and placed over the triangular confiuration of the longitudinal member 12. The flanges 38 engage the apertures 18 and are disposed therein to secure the snap-on members 34, 34' to the longitudianl member 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed:

1. A multi-purpose stake comprising:
   stake means forming a longitudinal member adapted to be supported substantially perpendicular to a support surface;
   a longitudinal member being tubular and having a triangular cross-sectional configuration;
   said longitudinal member having a bevel-shaped portion at one end to engage the support surface and a closed portion at the other end;
   said closed portion comprising a circular flange being of a diameter larger than the cross-sectional area of said longitudinal member;
   apertures means forming at least one pair of laterally spaced apertures on said longitudinal member, one of said apertures being on one side of said longitudinal member and the other on an adjacent side of said longitudinal member;
   said aperture means comprising a plurality of longitudinally spaced pairs of apertures;
   said apertures being elongated longitudinally;
   belt means disposed in said pair of said apertures and adapted to form an enclosure to support an object therein;
   said belt means comprising a belt being made of a polymer material and having a plurality of laterally spaced and longitudinally extending grooves;
   clip means for securing the ends of said belt means together and for allowing the diameter of said enclosure formed by said belt means to be adjusted;
   said clip means comprising a spring clip having a first portion being U-shaped and a second portion spaced from said first portion and having at least one end connected to one end of said first portion;
   said first and second portions including projections extending inwardly to engage said belt to secure said belt in position therein;
   snap-on means for removably engaging said pair of apertures to support an object thereon;
   said snap-on means comprising a flexible member having a pair of legs extending outwardly and forming a V-shaped configuration with a flange disposed transversely at one end thereof, said flange engaging said apertures and being disposed therein;
   said flexible member including a body portion forming an aperture therein.

* * * * *